(12) United States Patent  
Kverel

(10) Patent No.: US 9,169,080 B2  
(45) Date of Patent: Oct. 27, 2015

(54) ROLLER STRUCTURE WITH ANTI-FRICTION BEARINGS

(71) Applicant: Eugene Kverel, New York, NY (US)

(72) Inventor: Eugene Kverel, New York, NY (US)

(*) Notice: Subject to any disclaimer, the term of this patent is extended or adjusted under 35 U.S.C. 154(b) by 155 days.

(21) Appl. No.: 13/742,988

(22) Filed: Jan. 16, 2013

(65) Prior Publication Data
US 2014/0197006 A1 Jul. 17, 2014

(51) Int. Cl.
*B65G 39/09* (2006.01)
*F16C 33/66* (2006.01)
*F16C 13/02* (2006.01)
*F16C 19/06* (2006.01)
*F16C 19/28* (2006.01)

(52) U.S. Cl.
CPC ............... *B65G 39/09* (2013.01); *F16C 13/02* (2013.01); *F16C 33/6696* (2013.01); *F16C 19/06* (2013.01); *F16C 19/28* (2013.01); *Y10T 29/49547* (2015.01)

(58) Field of Classification Search
CPC .................. Y10T 29/49547; Y10T 29/49551; Y10T 29/49556; D21G 1/02; D21G 1/0226; B65G 39/09; F16C 19/08; F16C 19/18; F16C 19/10; F16C 19/28; F16C 19/38; F16C 19/04; F16C 19/14; G16C 13/02; G16C 13/022
See application file for complete search history.

(56) References Cited

U.S. PATENT DOCUMENTS

| 3,790,239 | A | * | 2/1974 | Laux et al. ................. 384/463 |
| 5,002,798 | A | * | 3/1991 | Donley et al. .............. 427/596 |
| 5,722,888 | A | | 3/1998 | Lane |
| 5,900,197 | A | * | 5/1999 | Matsui et al. ............... 264/49 |
| 8,672,557 | B2 | * | 3/2014 | Horling et al. .............. 384/536 |
| 2012/0152701 | A1 | * | 6/2012 | Kern .......................... 198/842 |
| 2012/0201487 | A1 | | 8/2012 | Kverel |
| 2013/0342060 | A1 | * | 12/2013 | Sibley ........................ 310/90 |

* cited by examiner

*Primary Examiner* — Jason L Vaughan
(74) *Attorney, Agent, or Firm* — Tutunjian & Bitetto, P.C.

(57) ABSTRACT

A roller structure including a cylindrical casing having an outer wear surface and an inner surface provided by a bore extending through the cylindrical casing. At least one anti-friction bearing is positioned within the bore in contact with the inside surface of the cylindrical casing. The anti-friction bearing includes a solid lubricant. In one embodiment, the roller structure is a roller turn roller and is a component of a guide for a turn of a conveyor system, wherein the outer wear surface is for contacting the chain of the conveyer system. A method of lubricating a roller structure is also provided.

14 Claims, 9 Drawing Sheets

ROLLER STRUCTURE WITH ANTI-FRICTION BEARINGS

BACKGROUND

The present disclosure generally relates to roller structures. More particularly, in some embodiments, the present disclosure relates to roller turn rollers used in conveyor systems.

Roller turn rollers are utilized in conveyor systems to control and guide the moving components of the conveyor around curves or turns and prevent lateral displacement of such components from the intended course. In a power and free conveyor, for example, a series of such rollers at the inside of a turn hold the power chain in proper horizontal alignment with the free rail of the conveyor system to maintain inter-engagement with driven trolleys. It is common to use oil or grease to lubricate the bearings used in roller turn rollers to extend the service life of the bearing.

SUMMARY

In one aspect, the present disclosure provides a roller structure including a cylindrical casing having an outer wear surface and an inner surface provided by a bore extending through the cylindrical casing and at least one anti-friction bearing positioned within the bore in contact with the inside surface of the cylindrical casing. A bushing may be proximate to each side of the casing. In one embodiment, the bushing has a cylindrical body in contact with a bearing bore surface of the at least one anti-friction bearing, and a flange in contact with an outside face surface of an inner ring of the at least one anti-friction bearing.

In another aspect, the present disclosure provides a roller structure including a cylindrical casing having an outer wear surface and an inner surface that is provided by a bore extending through the cylindrical casing. At least one anti-friction bearing is positioned within the bore in contact with the inside surface of the cylindrical casing. The anti-friction bearing includes a solid lubricant. In one embodiment, the roller structure is a roller turn roller.

In another aspect of the present disclosure, a method of lubricating a roller structure is provided that includes applying a solid lubricant to at least one anti-friction bearing. In some embodiments, applying the solid lubricant to the at least one anti-friction bearing may include the steps of providing a mixture of graphite and a binder; applying the semi liquid mixture to the raceway of the at least one anti-friction bearing; and heating the at least one anti-friction bearing until the mixture is cured to provide a graphite based solid lubricant. After the solid lubricant is formed on the at least one anti-friction bearing, the at least one anti-friction bearing may be positioned within the bore of the cylindrical casing of a roller structure.

DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Figure 1A:
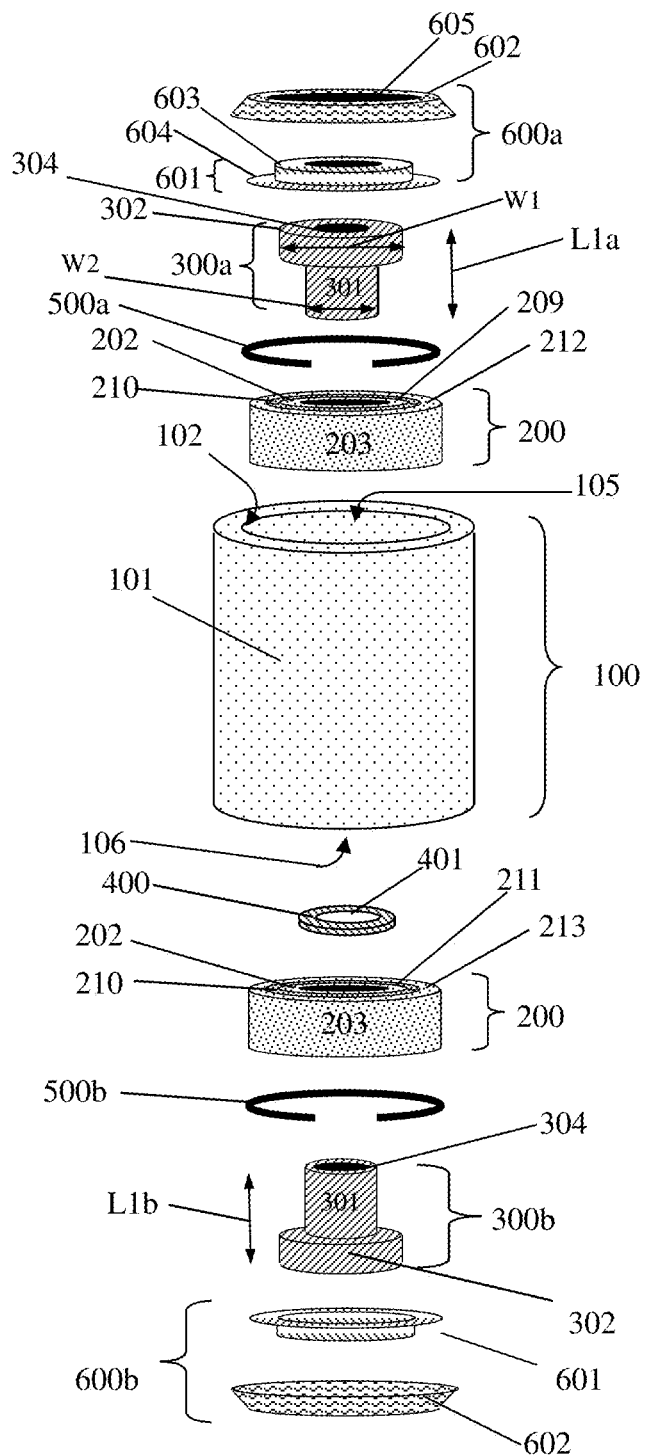
FIG. 1A is an exploded perspective view depicting a roller structure including anti-friction bearings that are lubricated with a solid lubricant, in accordance with one embodiment of the present disclosure.

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the embodiments of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For purposes of the description hereinafter, the terms "upper", "lower", "vertical", "horizontal", "top", "bottom", and derivatives thereof shall relate to the disclosed structures, as it is oriented in the drawing figures.

Typically, to extend the life of roller structures, such as roller turn rollers, the anti-friction bearings of the roller structures are lubricated. However, there are situations where oil or grease is not suitable as a lubricant for the anti-friction bearings. For example, in harsh environments, such as in high temperature environments, oil or grease may not function properly. Moreover, there are situations where oil or grease is not suitable to use due to environmental concerns, such as in the food and beverage industry. Further, application of lubricants to roller structures, such as roller turn rollers, can be a labor intensive and timely procedure. When roller turn rollers are employed in overhead conveyor applications, dripping oil and grease from roller turn rollers can land on the floor and become a safety hazard.

The methods and structures disclosed herein can overcome the disadvantages of utilizing liquid lubricants, such as oils and grease, to lubricate roller structures. In some embodiments, the disadvantages of liquid lubricants in roller structures can be overcome by applying a solid lubricant to anti-friction bearings that are present in the cylindrical casing of the roller structure, e.g., roller turn roller. As used herein, the term "anti-friction bearing" denotes a bearing utilizing rolling elements. For example, in an anti-friction bearing the rolling elements can be held between inner and outer rings of the antifriction bearing. The solid lubricant could be composed of solid component, such as graphite, metal chalcolgenide or polymer, and a binder that is prepared in such a way as to allow for a mixture or the solid component and binders to be injected into the anti-friction bearing and then cured to harden the mixture within the anti-friction bearing. The solidified mixture can substantially fill the space between the inner and outer races (also referred to as inner and outer rings) of the anti-friction bearing, encapsulating the roller elements, e.g., balls or rollers, and the cage (optional). When the anti-friction bearing rotates (or moves in any manner) the solid lubricant moves in conjunction with the rolling elements, e.g., cage and balls or rollers. The thin film of solid lubricant prevents metal to metal contact between the roller elements, e.g., balls or rollers, and the races, e.g., inside and outside rings, and provides a low coefficient of friction for the roller elements over the races.

In addition to the solid lubricant, the present disclosure also provides a roller structure design that includes bushings, and optionally spacers, to position an anti-friction bearing within the bore of the cylindrical casing of the roller structure. In some embodiments, the bushings reduce side loading of the anti-friction bearings and to ensure that that bore of the anti-friction bearings is centered within the bore of the cylindrical casing. In some embodiments, the spacer can be optional when the roller structure employs a single anti-friction bearing, but spacers are typically employed when the roller structure includes multiple anti-friction bearings. When employed, the spacers may be positioned between adjacent anti-friction bearings to keep the inner rings (also referred to as races) of the anti-friction bearings from contacting one another.

In some embodiments, the solid lubricant is a graphite based solid lubricant that is employed in the roller structure, in which the graphite based solid lubricant provides for continuous replenishment of graphite lubricant on the internal moving parts of the roller structure, such as a roller turn roller. Graphite based solid lubricants are only one example of solid lubricants that are suitable for use with the anti-friction bearings and roller structures disclosed herein. As will be discussed herein, a number of other solid lubricants are suitable for use with the methods and structures disclosed herein, such as molybdenum disulphide, tungsten disulfide, and combinations thereof, etc.

In some embodiments, the solid lubricant will not be washed out or adversely affected by steam or chemical wash down, and the solid lubricant allows for the roller structures including anti-friction bearings to be submerged in most chemicals (even mild acid or alkali) because it will not dissolve. Further, the solid lubricant with not drip out of the roller structure or fling from the roller structure, and typically exhibits low out-gassing, even at high temperatures. In the embodiments, in which the solid lubricant is based of molybdenum disulphide, the reduced out-gassing of the solid lubricant makes the solid lubricant an ideal lubricant for vacuum applications. In some embodiments, the solid lubricant that is employed in the disclosed roller structure is resistive to deterioration due to radiation or UV, non-toxic, and is not harmful to the environment. In some examples, the solid lubricant disclosed herein provides free spinning lubrication from sub-zero temperatures up to 660° F., and momentary spikes of very high temperatures, such as greater than 1500° F., will not damage the solid lubricant.

Figure 1B:
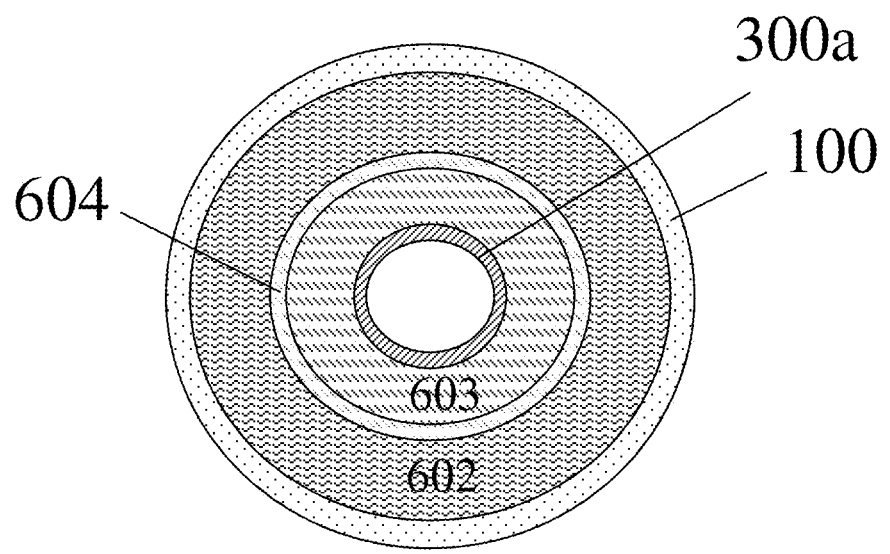
FIG. 1B is a top down perspective view of an assembled roller structure that is consistent with the embodiment that is depicted in FIG. 1A.
Figure 1C:
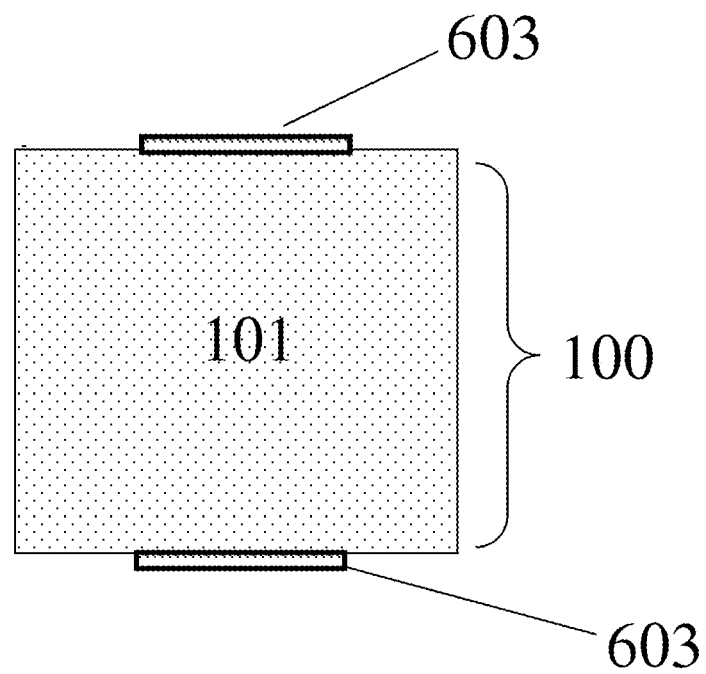
FIG. 1C is a side perspective view of an assembled roller structure that is consistent with the embodiment that is depicted in FIG. 1A.
Figure 2:
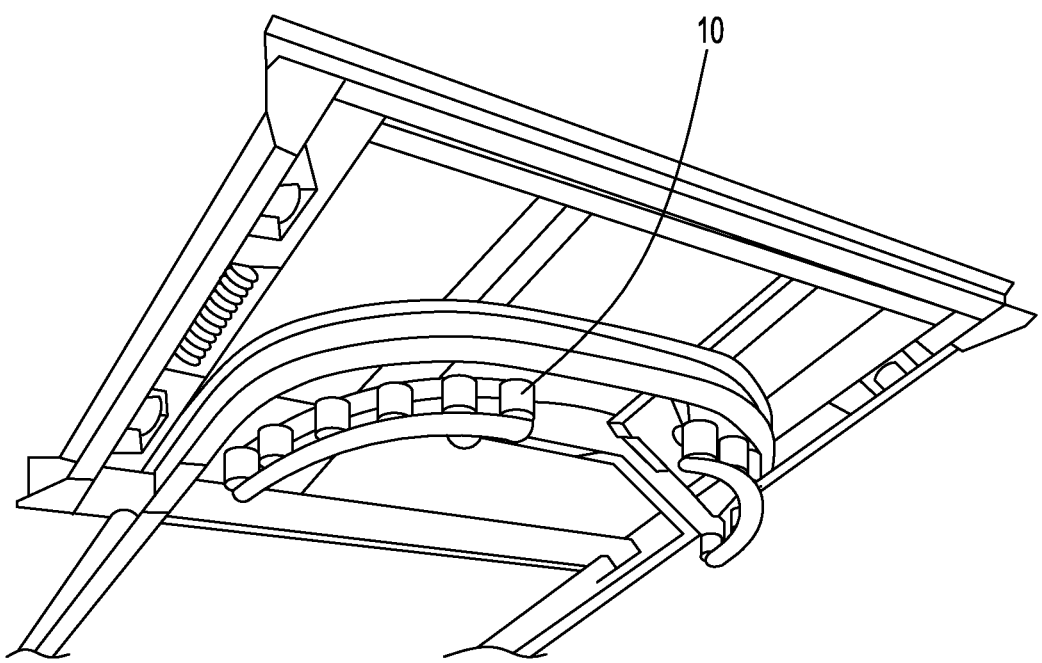
FIG. 2 is a perspective view of a roller structure as used as a roller turn roller in accordance with one embodiment of the present disclosure.

FIGS. 1A-1C depicts one embodiment of a roller structure, such as a roller turn roller, that includes a cylindrical casing 100 having an outer wear surface 101 and an inner surface 102 provided by a bore extending through the cylindrical casing 100, and at least one anti-friction bearing 200 positioned within the bore in contact with the inside surface 102 of the cylindrical casing 100. The roller structure that is depicted in FIGS. 1A-1C is a roller turn roller 10 and is a component of a guide for a turn of a conveyor system, wherein the outer wear surface 101 of the cylindrical casing 100 is for contacting flexible element of the conveyer system (such as chain, belt), as depicted in FIG. 2. Although some embodiments of the present disclosure describe a roller structure for use as a roller turn roller as a component for a turn guide of a conveyor system, the present disclosure is not limited to only roller turn rollers. The roller structures and the method of lubricating roller structures that is disclosed herein applies to roller structures for any application.

The cylindrical casing 100 of the roller structure may be composed of a metal, such as steel, high carbon steel, stainless steel, tool steel, or combinations thereof. The cylindrical casing 100 may also be composed of other metals than steel, such as aluminum. Further, in some embodiments, the cylindrical casing 100 may be composed of a polymer, such as thermoplastic or thermosetting polymer. To provide a durable outer wear surface 101, a coating may be applied to the exterior surface of the cylindrical casing 100. For example, a ceramic coating may be applied to the exterior surface of the cylindrical casing 100 to provide the outer wear surface 101.

Figure 5A:
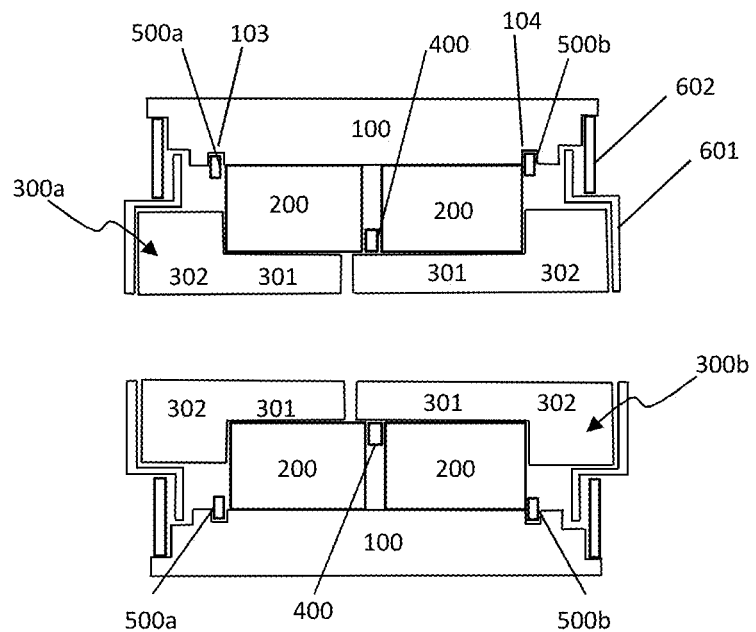
FIGS. 5A-5E are side cross-sectional views of a roller structure including at least one anti-friction bearing lubricated with a solid lubricant, in accordance with some embodiments of the present disclosure.

The bore that extends through the cylindrical casing 100, and provides the inside surface 102 of the cylindrical casing 100, has dimensions for housing at least one anti-friction bearing 200. Although, FIG. 1A and FIGS. 5A-5E depict two anti-friction bearings 200 being positioned within the bore of the cylindrical casing 100, the present disclosure is not limited to only this embodiment. Any number of anti-friction bearings 200 may be positioned within the cylindrical casing 100. For example, embodiments have been contemplated in which one, two, three, four and five anti-friction bearings 200 can be contained within the bore of the cylindrical casing 100. For example, FIG. 6 further depicts a roller structure including four anti-friction bearings 200, and also depicts a nut and bolt assembly 600 extending through the roller structure. The inside surface 102 may include ridges and grooves that contribute to retaining the anti-friction bearings 200 within the bore of the cylindrical casing 100. Further details regarding the grooves and ridges of the inside surface 102 of the cylindrical casing 100 is provided below in the description of FIGS. 5A-5E.

Figure 3A:
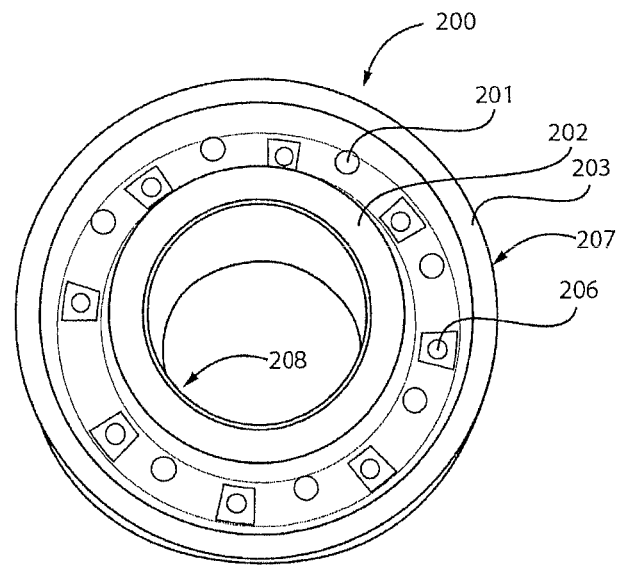
FIG. 3A is a photograph of an anti-friction bearing prior to the application of the solid lubricant to the anti-friction bearing, as used in accordance with one embodiment of the present disclosure.

Some embodiments of the anti-friction bearings 200 that are suitable for the roller structure depicted in FIGS. 1A-1C are depicted with greater detail in FIGS. 3A-4D. FIGS. 3A and 3B depict an anti-friction bearing 200 before being lubricated with the solid lubricant. In some embodiments, the at least one anti-friction bearing 200 includes roller elements 201 positioned between an inner ring 202 and an outer ring 203. The inner ring 202 and the outer ring 203 may also be referred to as being "races". The inner ring 202 and the outer ring 203 may each include a groove for containing the roller elements 201. The grooved surface of the inner ring 202 may be referred to as an inner ring raceway surface 204, and the grooved surface of the outer ring 203 may be referred to as an outer ring raceway surface 205. The roller elements 201 may be ball shape bearings, sphere shape bearings, cylindrical roller bearings, needle bearings, tapered bearings or a combination thereof. The roller elements 201 are typically composed of a metal, such as bearing steel, stainless steel, ceramic, polymer or glass. In one example, the bearing steel composition of the roller elements 201 may have carbon (C) content in the range of 0.55 wt. % to 1.10 wt. %, manganese in the range of 0.10 wt. % to 1.15 wt. %, silicon (Si) in the range of 0.15 wt. % to 2.0 wt. %, phosphorus (P) and sulfur (S) up to a maximum of 0.03 wt. % and chromium (Cr) in the range of 0.5 wt. % to 2.0 wt. %, and a remainder substantially of iron (Fe). Other materials and compositions that are suitable for the roller elements 201 include M50 tool steel (AMS6491), carbon chrome steel (AMS6444), corrosion resistant steel (AMS5930), 440C stainless steel, and 440C stainless steel coated with titanium carbide. The roller elements 201 may also be composed of a ceramic, such as silicon nitride. In some embodiments, in which the anti-friction bearing 200 is used in a high temperature applications, the dimensions of the roller elements 201, spacing between adjacent roller elements 201, and the dimensions of the inner and out rings 202, 203 are selected to meet the requirements of ASTM C4 standard.

Figure 3B:
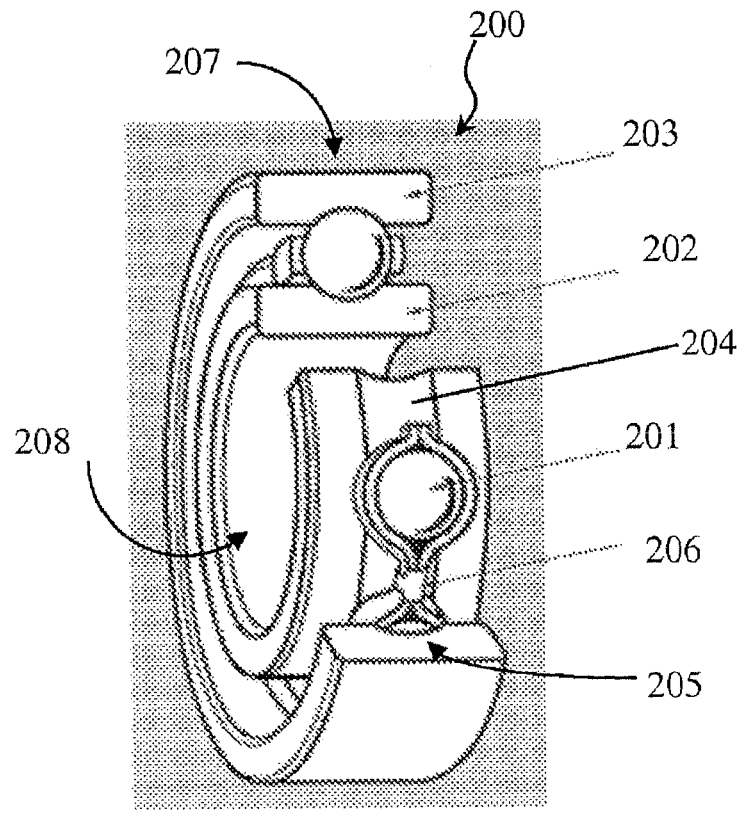
FIG. 3B is a sectioned perspective view of an anti-friction bearing consistent with the embodiment that is depicted in FIG. 3A.

Typically, the roller elements 201 are present in what is referred to as the loaded zone of the anti-friction bearing 200, in which the roller elements 201 are in contact with the inner ring raceway surface 204 and the outer ring raceway surface 205 so that the inner ring 202 and the outer ring 203 may rotate relative to one another. Although, the roller elements 201 that are depicted in FIGS. 3A and 3B are configured in a single row of bearings, the present disclosure is not limited to only this embodiment. For example, the roller elements 201 of the anti-friction bearing 200 may be configured in a double row design, which would also include two raceway surfaces in the inner and outer rings 202, 203. The exterior sidewall surface of the outer ring 203 may be referred to as the outside diameter surface 207. Referring to FIGS. 1A, 3A and 3B, when the anti-friction bearing 200 is positioned within the bore of the cylindrical casing 100, the outside diameter surface 207 of the outer ring 203 is in contact with the inside surface 102 of the cylindrical casing 100. The exterior sidewall surface of the inner ring 202 may be referred to as the bearing bore surface 208.

The anti-friction bearing 200 may also include a cage 206. The cage 206 is a separator that spaces and holds the rolling elements 201 in their proper positions along the races. The cage 206 may be made of a metal, such as iron (Fe), copper (Cu) or brass, but it may also be made of a polymeric material.

In yet another embodiment, the cage 206 may be composed of a solid lubricant, such as a graphite based solid lubricant. In other embodiments, a simple spacer (not shown) may be present between roller elements 201, in which the spacer obstructs the roller elements 201 from being displaced from a desired spacing within the raceways of the inner and outer rings 202, 203 of the anti-friction bearing 200. Similar to the cage 206, the spacer may be made of a metal, such as iron, steel, copper or brass, or a polymeric material. In yet another embodiment, the spacer may be composed of a solid lubricant, such as the graphite based solid lubricant. It is noted that the present disclosure is not limited to the anti-friction bearing 200 confirgurations that are depicted in FIGS. 3A and 3B. For example, any anti-friction bearing is suitable for use with the present disclosure including, but not limited to, deep-groove ball bearing, angular contact ball bearing, a self-aligning ball bearing, a spherical roller bearing, a tapered roller bearing, a cylindrical roller bearing, a toroidal roller bearing or any other type of roller bearing.

FIGS. 4A-4D depict the solid lubricant 210 that has been applied to the anti-friction bearing 200 depicted in FIGS. 3A and 3B. In some embodiments, the solid lubricant 210 fills substantially the entire space between the inner ring 202, the outer ring 203, the roller elements 201 and a separating element (when present) that is separating the roller elements 201, e.g., a cage 206 or spacer (not shown). When the space between the inner and outer rings 202, 203 is totally filled with the solid lubricant 210, the roller elements 201 and the separating element may be completely enclosed by the solid lubricant 210 between the inner and outer rings 202, 203. A narrow gap can form around the rolling elements 201 and the raceway surfaces 204, 205 of the inner and outer rings 202, 203 to enable the bearing components to rotate freely while the solid lubricant 210 may be bonded to the separating element, e.g., cage 206 or spacer. In some other embodiments, only a portion of the space between the inner ring 202, the outer ring 203, the roller elements 201 and the cage 206 (when present) is filled with the solid lubricant 210.

In the embodiments, in which a cage 206 is present separating the roller elements 201, the solid lubricant 210 is at least partly attached to the cage 206. In some embodiments, the solid lubricant 210 may enclose all surfaces of the cage 206. If the separating element is a spacer, the solid lubricant 210 may be attached to the spacer. The solid lubricant 210 may enclose the spacer as a whole, but it may also only cover specific surfaces of the spacer. In an embodiment, the solid lubricant 210 is at least partly attached to the surface of the spacer that is intended to be in contact with the rolling element 201 and/or the inner and outer rings 202, 203 of the anti-friction bearing 200.

In an embodiment of the anti-friction roller bearing 200, the solid lubricant 210 is the separating element. More specifically, in some embodiments, the solid lubricant 210 may be shaped in the form of a spacer or a cage of different designs. In such a case, there is no use of a metal or polymer cage or spacer. The solid lubricant 210 is thus lubricating the anti-friction bearing 200, and at the same time is separating the roller elements 201 in the anti-friction roller bearing 200. In an embodiment, the space between the inner and outer rings 202, 203 is totally filled with the solid lubricant 210, in which the solid lubricant 210 is surrounding the rolling elements 201. In some embodiments, a narrow gap will form around the rolling elements 201 and raceways, i.e., inner ring raceway surface 204 and the outer ring raceway surface 205, enabling the bearing components to rotate freely. The solid lubricant 210 may be molded into the anti-friction bearing 200.

The composition of the solid lubricant 210 provides a solid lubricant for the anti-friction bearing 200 that can be heat resistant and which also provides low friction and low wear of the rolling and/or sliding contact surfaces in the anti-friction bearing 210, thereby allowing the anti-friction bearing 210 to run with high speed and/or extend the service life of the anti-friction bearing 210. During operation, the solid lubricant 210 comes into contact with surfaces, e.g., metallic surfaces, of the anti-friction bearing 200 and a solid lubricant film will be built by abrasion. If the solid lubricant film is removed, a new film will be built by the reservoir of the compound present in the solid lubricant 210.

In some embodiments, the solid lubricant 210 is a graphite based solid lubricant that includes at least 10 wt. % of graphite and a binding material. In some embodiments, the binder component of the graphite based solid lubricant is selected from a clay composition, an epoxy or a thermosetting polymer. In one example, in which the binder is a thermosetting polymer, the binder may be phenol-formaldehyde resin. In some embodiments of the graphite based solid lubricant, the graphite based solid lubricant may further include a reinforcement fiber. In one example, the reinforcement fiber may be fiberglass.

It is noted that graphite based solid lubricants are only one example of solid lubricants that are applicable to the methods and structures disclosed herein, and it is not intended that the solid lubricant 210 that is employed in the roller structure be limited to only graphite based solid lubricants. For example, the solid lubricant 210 may be any solid material that can provide a lubricating function to the moving elements of the anti-friction bearing 200 that is employed in the roller structure. In some embodiments, the solid lubricant 201 may be an inorganic particles with a lamellar structure. The crystal structure of these materials typically has a layered structure consisting of hexagonal rings forming thin parallel planes. Within the plane each atom is strongly bonded (covalent bonding) to other atoms. The planes are bonded to each other by weak Van der Waals forces. The layered structure allows sliding movement of the parallel planes. Weak bonding between the planes determines low shear strength and lubricating properties of the materials. Examples of inorganic solid lubricants with lamellar structure suitable for use as the solid lubricant 210 in the roller structure include graphite, molybdenum disulphide ($MoS_2$) and boron nitride (BN). Other examples of such materials are sulphides, selenides and tellurides (chalcogenides) of molybdenum, tungsten, niobium, tantalum, titanium (eg. $WS_2$, $MoSe_2$, $TaSe_2$, $TiTe_2$), monochalcenides (GaS, GaSe, SnSe), chlorides of cadmium, cobalt, lead, cerium, zirconium (eg. $CdCl_2$, $CoCl_2$, $PbCl_2$, $CeF_3$, $PbI_2$) and also some borates (eg. $Na_2B_4O_7$) and sulfates ($Ag_2SO_4$). Combinations of the above described materials may also be employed as the solid lubricant 210.

In some other embodiments, the solid lubricant 210 may be an oxide, such as boron oxide ($B_2O_3$), molybdenum oxide ($MoO_2$), zinc oxide (ZnO), renium oxide ($Re_2O_7$), titnaium oxide ($TiO_2$), $CuO$—$MoO_2$, $NiO$—$Mo_2$, $PbO$—$B_2O_3$, $CuO$—$Re_2O_7$ and combinations thereof. In yet another example, the solid lubricant 210 may be a metal, i.e., soft metal. Due to their low shear strength and high plasticity some soft metals possess lubrication properties. Examples of metals that can be employed as the solid lubricant include lead (Pb), tin (Sn), bismuth (Bi), indium (In), cadmium (Cd), silver (Ag) and combinations thereof. In yet a further embodiment, the solid lubricant 210 may be a polymer. Examples of polymers that are suitable for the solid lubricant 210 include polytetrafluoroethylene (PTFE), fluoroethylenepropylene (FEP), perfluoroalkoxy (PFA), polyethylene (PE), polypropylene (PP), polyurethane (PU), polyamide, polyacetals, polysiloxane, nylon, phenol-formaldehyde, urea-melamine-formaldehyde, epoxy resin, unsaturated polyester resin, polyimides and combinations thereof.

In one embodiment, the solid lubricant 210, e.g., graphite based solid lubricant, further includes particles, e.g., lubricating nanoparticles. In some embodiments, the particles that are present in the solid lubricant 210 lubricate by a mechanism that can be compared to the rolling of millions of miniature rolling bearings, thus greatly reducing friction and wear. The particles may have dimensions ranging from 5 nm to 4 µm. In some embodiments, the particles may be nanoparticles. As used herein, the term "nanoparticles" denotes a particle having a greatest dimension that is less than 1 micron (µm). In one embodiment, the nanoparticles have an average size ranging from 5 nm to 500 nm. In another embodiment, the nanoparticles have an average size ranging from 30 nm to 160 nm. In a further embodiment, the nanoparticles have an average size ranging from 160 nm to 500 nm.

In one embodiment, the particles of the solid lubricant 210 may have a hollow or solid nanosphere geometry, rod like geometry, platelet geometry, nanotube geometry or a combination of the aforementioned geometries. For example, the solid lubricant 210 may include particles of carbon fullerenes or carbon nanotubes. In another embodiment, the solid lubricant 210 may be composed of inorganic particles, such as fullerene like inorganic nanoparticles. For example, the inorganic particles may be composed of a metal chalcogenide. In one example, the metal element of the metal chalcogendide is selected from the group consisting of molybdenum (Mo), tungsten (W), vanadium (V), zirconium (Zr), hafnium (Hf), platinum (Pt), palladium (Pd), rhenium (Re), niobium (Nb), tantalum (Ta), titanium (Ti), chromium (Cr), ruthenium (Ru) and a combination thereof, and the chalcogen is selected from the group consisting of selenium (Se), sulfur (S), tellurium (Te) and combinations thereof. Examples of metal dichalcogenides suitable for using as particles in the graphite based solid lubricant 210 include metal dichalcogenides having the chemical formula $MX_Z$, wherein M is molybdenum (Mo), tungsten (W), or any other transition metal, and wherein X is sulfur (S), selenium (S), tellurium (Te), oxygen (O) or any other appropriate chalcogen. Z may range from 1 to 3. In one example, the particles are tungsten disulfide nanospheres either hollow or solid. In another example, the particles are platelets like tungsten disulfide. In another example, the particles include molybdenum disulfide in the form of hollow or solid sphere, hollow or solid tube, or irregular form platelet. The particles may also be composed of boron nitride, boron nitride, zinc oxide, zinc phosphide, copper, boron, diamond like carbon (DLC), cerium fluoride, idium, lead, silver, tin or a combination thereof.

The solid lubricant 210, e.g., graphite based solid lubricant, may include at least 0.01 wt % of particles. In one embodiment, the solid lubricant 210 includes particles in an amount ranging from 0.01 wt % to 10 wt %. In another embodiment, the solid lubricant 210 includes particles in an amount ranging from 0.1 wt % to 15 wt %. In yet another embodiment, the solid lubricant 210 includes particles in an amount ranging from 1 wt % to 2 wt %. In one example, solid lubricant 210 may include 1 wt % of particles composed of molybdenum disulfide.

Forming the solid lubricant 210 on the anti-friction bearing 200 can be a multi-stage process. In one example, in which the solid lubricant 210 is a graphite based solid lubricant, the process for forming the graphite based solid lubricant may begin with thoroughly cleaning and inspecting the anti-friction bearing 200 for initial defects. A mixture of graphite and binder in a paste consistency may then be poured into the raceway, i.e., the space between the inner and outer rings 202, 203 containing the roller elements 201, of the anti-friction bearing 200. The mixture of graphite and binder may include graphite powder and a binder of phenolic resin. Other examples of binders that are suitable at this stage of the present disclosure include epoxy, polymer resin or combinations thereof. The viscosity of the mixture of graphite and binder is selected to allow for the mixture to be poured into the raceway and flow around the roller elements 201 and separating elements (when present), such as the cage 206, so that the mixture of graphite and binder can fill the raceway.

The mixture of graphite and binder may then be injected into at least a part of the space, i.e., raceway, between the inner ring 202 and an outer ring 203 of an anti-friction bearing 200, and thereafter cured until the mixture of graphite and binder solidifies to provide the solid lubricant 210. In some embodiments, the mix of the components of the graphite based solid lubricant is in a semi-liquid phase when injecting it into the raceway of the anti-friction bearing 200. The curing step may include heating the anti-friction bearing 200 including the mixture of graphite and binder in a furnace at a temperature ranging from 200° F. to 700° F. for a time period ranging from 30 minutes to 7 hours. In another embodiment, the curing step may include heating the anti-friction bearing 200 and the mixture of graphite and binder at a temperature ranging from 250° C. to 650° C. for a time period ranging from 1 hour to 6 hours. In yet another embodiment, the curing step may include heating the anti-friction bearing 200 and the graphite mixture at a temperature ranging from 300° C. to 700° C. for a time period ranging from 2 hour to 5 hours. It is noted that the above temperatures and time periods for the curing step are provided for illustrative purposes only, and are not intended to limit the present disclosure. Other temperatures and times have been considered for the curing step, so long as the time and temperature that is selected solidifies the mixture of liquid graphite and binder. Further, it is not always necessary that the graphite mixture be cured thermally. For example, the graphite mixture may be cured using chemical reaction of by the application of ultraviolet (UV) light. Following curing, excess graphite may be cleaned off the anti-friction bearing 200.

In one embodiment, after the curing of the liquid graphite mixture to provide the solid lubricant 210, e.g., graphite based solid lubricant, in the anti-friction bearing 200, particles, such as nanoparticles, may then be injected into the solid lubricant 210. More specifically, the particles, e.g., nanoparticles or micron size particles, may be mixed with a high-density liquid having a density greater than 1.8 g/cm$^3$. In one embodiment, the high-density liquid is an oil, such as perfluorpolyether (PFPE). In one embodiment an anti-rust additive may also be mixed in the high-density liquid. The mixture of the high density liquid and the particles, e.g., nanoparticles, may then be applied to the graphite based solid lubricant 210. The high density liquid facilitates incorporation of the particles, e.g., nanoparticles, into the solid lubricant 210. In yet another embodiment, the oil that the particles and the anti-rust additive is mixed with before being introduced to the graphite mixture is a mineral oil, which is not a high density liquid.

In some embodiments, the solid lubricant 210, e.g., graphite based solid lubricant, may be a porous structure. More specifically, when the solid lubricant 210 is a porous structure a first phase, i.e., matrix, is composed of a solid graphite based material, and a second phase, i.e., dispersed phase, is composed of a series of pores. In one example, the porosity by volume percent of the solid lubricant 210 may range from 10% to 50%. In one embodiment, the solid lubricant 210 includes inorganic particles, e.g., nanoparticles and micron sized particles, and the solid lubricant 210 has a porous structure, the inorganic particles are embedded in the porous structure. In some examples, the inorganic particles may provide a lubricating function.

In some embodiments, the solid lubricant 210 may be impregnated with a liquid oil. In these embodiments, the liquid oil is encapsulated in the solid lubricant 210. Examples of liquid oil that may be encapsulated in the solid lubricant 201 include mineral oil, synthetic oil, synthetic hydrocarbon oil, ester oil, synthetic ester oil, synthetic hydrocarbon and ester oil blend, polyalphaolefin (PAO) oil, polyalkylene glycol (PAG) and combinations thereof.

The roller structure depicted in FIG. 1A includes two anti-friction bearings 200, wherein a bushing 300a, 300b is engaged to each anti-friction bearing 200. In some embodiments, the bushings 300a, 300b provide for alignment of the anti-friction bearings 200 within the bore of the cylindrical casing 100. Each bushing 300a, 300b includes a cylindrical body 301 and a flange 302. Each bushing 300a, 300b may be a unitary structure. By "unitary structure" it is meant that the bushings 300a, 300b are formed, e.g., machined, from a single material, and are not an assembly of multiple parts that are joined adhesively, by friction engagement or by threaded connection. Each bushing 300a, 300b is typically composed of a metal. For example, the bushing 300a, 300b may be composed of chrome steel, e.g., SAE 52100, stainless steel, martensitic stainless steel, e.g., AISI 440C, austenitic stainless steel, e.g., AISI316, carbon alloy steel, e.g., AISI8620, AISI4320, AISIC1008, and AISIC1010, and combinations thereof. The bushing 300a, 300b may also be composed of a polymer or composite material.

In one embodiment, the flange 302 is present at one end of the bushing 300a, 300b and has a width W1, i.e., diameter, that is greater than the width W2 of the cylindrical body 301. In some embodiments, the width W1 of the flange 302 may be selected so that it has a diameter that contacts the outer sidewall face 209 of the inner ring 202 for each of the anti-friction bearings 200 that the bushing 300a, 300b is in contact with, while not contacting the outer ring 203 of the anti-friction bearings 200. Referring to FIGS. 1A and 5A-5E, the width W2 of the cylindrical body 301 is selected to be positioned within the bore through the anti-friction bearing 202, so that the exterior sidewall surface 303 of the cylindrical body 301 is in contact with the bearing bore surface 208 of the inner ring 202 of the anti-friction bearing 300 that the bushing 300a, 300b is contacting. The width W1 of the flange 302 is selected so that a portion of the flange 302 is in contact with the outer sidewall face 209 of the inner ring 202. Each of the bushings 300a, 300b may have a bolt through hole 304 present there through.

Figure 5B:
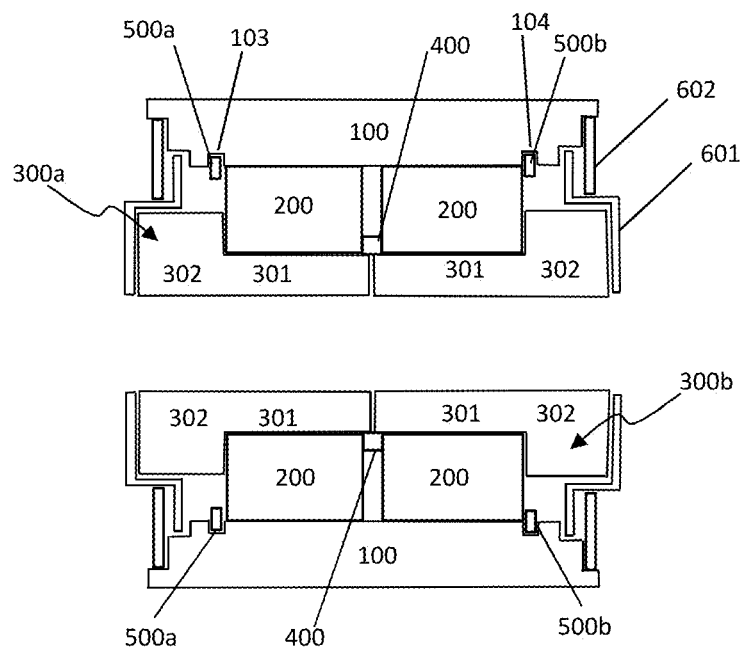
Figure 5C:
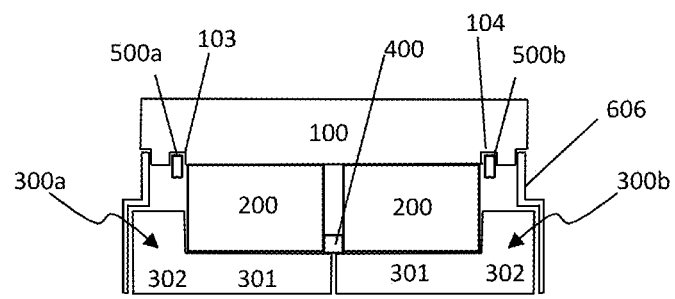
Figure 5C:
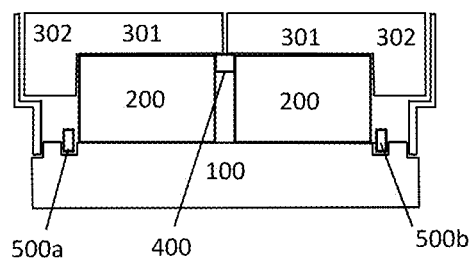
Figure 5D:
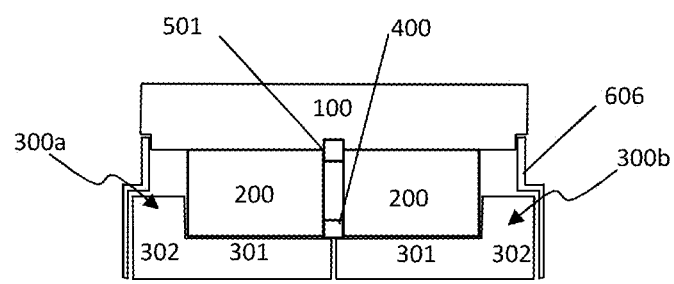
Figure 5D:
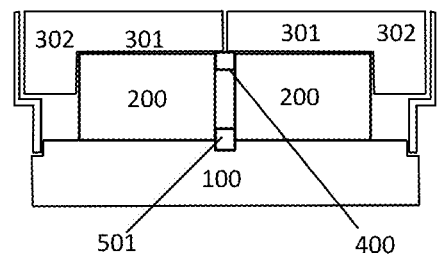
Figure 5E:
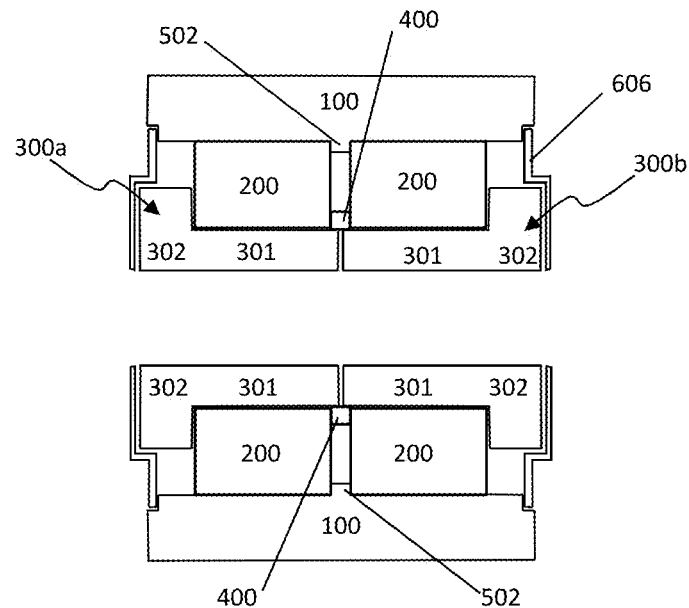
Figure 6:
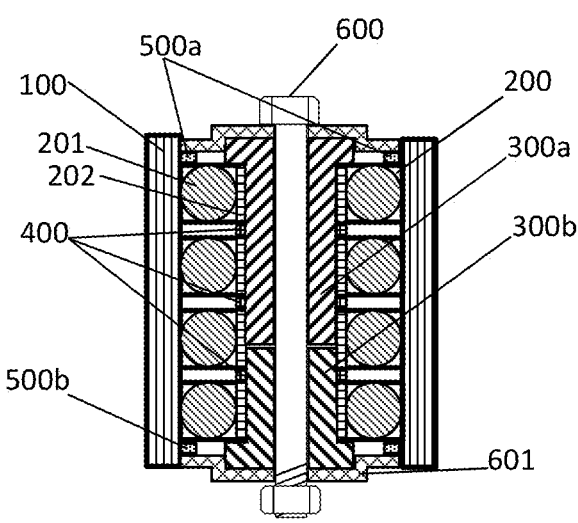
FIG. 6 is a side cross-sectional view depicting one embodiment of a roller structure including more than two anti-friction bearings, in accordance with the present disclosure.

In some embodiments, the length L1a, L1b of the cylindrical body 301 is equal for each of the bushings 300a, 300b. Examples consistent with this embodiment of the present disclosure are depicted in FIGS. 5B, 5C and 5E. In this embodiment, the length L1a, L1b of the cylindrical body 301 is selected so that an end portion of the cylindrical body 301 extends past the inner sidewall face 211 of the inner ring 202 when the flange 302 is in contact with the outer sidewall face 209 of the inner ring 202. In this embodiment, the end portions of the cylindrical body 301 for each of the first bushing 200a and the second bushing 200b that extend past the inner sidewall face 211 of the inner ring 202 for each of the anti-friction bearings 200 contact a later described spacer 400.

In another embodiment, the length L1a of the first bushing 300a is different than the length L1B of a second bushing 300b. For example, the length L1b of the second bushing 300*b* may be greater than the length L1*a* of the first bushing 300*a*. Examples consistent with this embodiment of the present disclosure are depicted in FIGS. 1A, 5A and 5D. In this embodiment, the length L1*b* of the cylindrical body 301 for the second bushing 300*b* is selected so that an end portion of the cylindrical body 301 extends past the inner sidewall face 211 of the inner ring 202 when the flange 302 is in contact with the outer sidewall face 209 of the inner ring 202. In this embodiment, the length L1*a* of the first bushing 300*a* is selected so that an end portion of the cylindrical body 301 does not extend past the inner sidewall face 211 of the inner ring 202 when the flange 302 is in contact with the outer sidewall face 209 of the inner ring 202. In this scenario, the edge, i.e., end portion, of the cylindrical body 301 for the first bushing 300*a* is recessed within the bearing bore. In this embodiment, only the end portion of the cylindrical body 301 for the second bushing 300*b* is in contact with the spacer 400.

Referring to FIGS. 1A and 5A-5E, in some embodiments, a spacer 400 is present between the anti-friction bearings 200. The spacer 400 includes a centrally positioned bore opening 401 having a diameter that allows for the cylindrical body 301 of at least one of the bushings 300*a*, 300*b* to be positioned within the centrally positioned bore opening 401. The outside sidewall of the cylindrical body 301 of at least one of the bushings 300*a*, 300*b* may contact the inside sidewall of the bore opening 401 of the spacer 400. Referring to FIGS. 5B, 5C and 5E, in some embodiments, when the length L1*a* of cylindrical body 301 of the first bushing 300*a* is the same as the length L1*b* of the cylindrical body 301 of the second bushing 300*b*, the spacer 400 may be in contact with the outside cylindrical body 301 of each of the first and second bushings 300*a*, 300*b*. Referring to FIGS. 1, 5A and 5B, in some embodiments, when the length L1*b* of the cylindrical body 301 of the second bushing 300*b* is greater than the length L1*a* of the cylindrical body 301 of the first bushing 300*a*, the spacer 400 may be in contact with only outside cylindrical body 301 of the second bushing 300*b*.

The spacer 400 is positioned within the bore through the cylindrical casing 100, and is present between the two anti-friction bearings 200. The spacer 400 has a thickness and an outer sidewall with a diameter that provides that the spacer 400 is in simultaneous contact with both the inner sidewall face 211 of the inner ring 202 of the first anti-friction bearing 200 and the inner sidewall face 211 of the inner ring 202 of the second anti-friction bearing 200. The spacer 400 is typically composed of a metal. The above-described metal compositions for the bushings 300*a*, 300*b* are suitable for the description of the metal composition for the spacer 400. Although FIGS. 1A and 5A-5E depict that the spacer 400 is a separate structure from the inner ring 202 of the anti-friction bearing 200, it is not intended that the present disclosure be limited to only this embodiment. For example, in some embodiments, the inner ring 202 may be machined to provide a spacer 400 that is integral with the inside sidewall face 211 of the inner ring 202. In this embodiment, the spacer 400 that is physically separated from the inner ring 202 of the anti-friction bearing 200 may be omitted.

When a bolt is passed through the bolt holes 304 of bushings 300*a*, 300*b*, and a nut is fastened to the end of the bolt torqued, the force produced by fastening the nut to the bolt is transferred from the head/nut of the nut and bolt assembly through the flange 302 of the bushings 300*a*, 300*b* to the inner rings 202 of the anti-friction bearings 200. The force is further transmitted through from the inner rings 202 of the anti-friction bearings 200 to the spacer 400 that is in direct contact with the inner ring of each of the anti-friction bearings 200 that are on opposing sides of the spacer 400. In this manner, the force that results from applying torque to the nut and bolt assembly is directly transmitted from the flange 302 of the bushings 300*a*, 300*b*, to the inner ring 202 of the anti-friction bearing 200, and to the spacer 400 in direct contact with the inner rings 202 of the anti-friction bearings 200 that are present on opposing sides of the spacer 400. Force transmitted from the nut and bolt assembly that extends through the bolt hole 304 is not transmitted to the cylindrical casing 100. The assembly of the bushings 300*a*, 300*b*, the spacer 400 and the anti-friction bearings 200 is retained within the cylindrical casing by the later described at least one retainer ring 500*a*, 500*b*. It is noted that the present disclosure is not limited to the above described nut and bolt assembly, as any fastening mechanism can be employed in combination with the structures and methods disclosed herein.

Referring to FIGS. 1A-1C and FIGS. 5A-5D, the roller structure may also include at least one retainer ring 500*a*, 500*b*. In some embodiments, the retainer ring 500 may be a detachable structure, such as a snap ring, that is fitted to a groove that is present in the inside surface 102 of the cylindrical casing 100, as depicted in FIG. 1A, and FIGS. 5A-5D. In some embodiments, the retainer ring 500*a*, 500*b* is a ridge that is integral with the inside surface 102 of the cylindrical casing 100. In one embodiment, the inside surface 102 of the cylindrical casing 100 is machined to provide the ridge that is integral with the inside surface 102 of the cylindrical casing 100.

FIGS. 1A, 5A, 5B, and 5C depict some embodiments of the present disclosure where a retainer ring 500*a*, 500*b* is engaged to a groove 103, 104 that is machined in the inside surface 102 of the cylindrical casing 100, in which the retainer ring 500*a*, 500*b* is positioned on opposing sides of the bore that is extending through the cylindrical casing 100. For example, a first groove 103 may be present proximate to a first opening 105 to the bore that is extending through the cylindrical casing 100 and a second groove 104 is present proximate to a second opening 106 to the bore that is extending through the cylindrical casing 100. The retaining ring 500*a*, 500*b* that is engaged to the first and second groove 103, 104 may be a snap ring.

Referring to FIGS. 1A, 5A, 5B and 5C, in one embodiment, engaging the retainer ring 500*a*, 500*b* to the inside surface 102 of the bore to the cylindrical casing 100 may begin with positioning an assembly of the first bushing 300*a*, the first anti-friction bearing 200, the spacer 400, the second anti-friction bearing 200 and the second bushing 300*b* within the bore of the cylindrical casing 100. The outside diameter surface 207 of the first and second anti-friction bearings 200 contact an inside surface 102 of the bore through the cylindrical casing 100. In a following step, a first retainer ring 500*a* is engaged to a first groove 103 that is present in the inside surface 102 of the bore in the cylindrical casing 100 proximate to a first opening 105, wherein the first retainer ring 500*a* contacts an outer sidewall face 212 of the outer ring 203 of the first anti-friction bearing 200. A second retainer ring 500*b* may then be engaged to a second groove 104 that is present in the inside surface 102 of the bore in the cylindrical casing 101 that is proximate to a second opening 106 to the bore. The second retainer ring 500*b* contacts an outer sidewall face 212 of the outer ring 203 of the second anti-friction bearing 200. The first retainer ring 500*a* obstructs the first and second anti-friction bearings 200 from be removed through the first opening 105. The second retainer ring 500*b* obstructs the first and second anti-friction bearings 200 from being removed through the second opening 106. As depicted in FIGS. 5A, 5B and 5C, the first and second retainer ring 500*a*, 500*b* are present on opposing sides of the assembly including the first and second anti-friction bearings 200 and the spacer 400, wherein the first retainer ring 500a contacts the outer sidewall face 212 of the outer ring 203 on a first anti-friction bearing 200 while the second retainer ring 500b is simultaneously contacting the outer sidewall 212 of the outer ring 203 of the second anti-friction bearing 200. Therefore, first and second retainer rings 500a, 500b limit the sliding motion of the first and second anti-friction bearing 200 in the direction extending from the first opening 105 to the second opening 106 through the bore of the cylindrical casing 100.

In some embodiments, it is not necessary that the first and second retainer ring 500a, 500b be detachable. For example, in one embodiment, a detachable retainer ring, such as a snap ring may be engaged into a groove at first opening to the bore through the cylindrical casing, while a ridge (also referred to as a retaining ring that is integral with the cylindrical casing) that is integrated into the inside surface of the cylindrical casing may be present at a second opening to the bore through the cylindrical casing. In this embodiment, prior to engaging the detachable retainer ring to the groove at the first opening to the bore through the cylindrical casing, an assembly of the first and second anti-friction bearings, the spacer and the bushing for each of the first and second antifriction bearings may be positioned within the cylindrical casing, wherein the ridge contacts an outer sidewall face of the outer ring of a second anti-friction bearing. Therefore, the detachable ring is engaged to the groove present in the inside surface of the bore in the cylindrical casing proximate to the first opening, wherein the detachable ring contacts an outer sidewall face of the outer ring of the first anti-friction bearing. The detachable retainer ring obstructs the first and second anti-friction bearings from be removed through the first opening. The ridge obstructs the first and second anti-friction bearings from being removed through the second opening. Therefore, the detachable retainer ring and the ridge limit the sliding motion of the first and second anti-friction bearing in the direction extending from the first opening to the second opening through the bore of the cylindrical casing.

Referring to FIG. 5D, in one embodiment, a groove for engaging a retainer ring 501, i.e., detachable retainer ring, such as a snap ring, is present proximate to the center of the length of the cylindrical casing 100. In this embodiment, there are no retainer rings at the openings to the bore extending through the cylindrical casing 100. The retainer ring 501 may contribute to positioning the anti-friction bearings 200 within the bore of the cylindrical casing 100. After the retainer ring 501 is engaged to the groove that is present in the inside surface 102 of the cylindrical casing 100, the first bushing 300a and the first anti-friction bearing 200 may be positioned within the bore. In one example, the cylindrical body 301 of a first bushing 300a is positioned in the bore of a first anti-friction bearing 200. The flange 302 of the first bushing 300a is in contact with the outer sidewall face 209 of the inner ring 202 for the first anti-friction bearing 200 and an end of the cylindrical body opposite 301 the flange 302 extends past the inner sidewall face 211 of the inner ring 202 of the first anti-friction bearing 200. A spacer 400 may then be positioned on the portion of the cylindrical body 301 of the first bushing 300a that extends past the inner sidewall face 211 of the inner ring 202 of the first anti-friction bearing 200. The spacer 400 contacts the inner sidewall face 211 of the inner ring 202 of the first anti-friction bearing 200. An assembly of the spacer 400, the first anti-friction bearing 200 and the first bushing 300a may be positioned within the bore of the cylindrical casing 100 through a first opening 105, wherein the inner sidewall surface 213 of the outer ring 202 of the first anti-friction bearing 200 contacts the retaining ring 501 that is centrally positioned in the bore. An assembly of the second bushing 300b and the second anti-friction bearing 200 may then be positioned in the bore of the cylindrical casing 100 through a second opening 106. The inner sidewall face 211 of the inner ring 202 of the second anti-friction bearing 200 contacts the spacer 400 and the inner sidewall face 213 of the outer ring 203 of the second anti-friction bearing 200 contacts the retaining ring 501 that is centrally positioned in the bore.

Referring to FIG. 5E, in another embodiment, a ridge 502 is present on the inside surface of the cylindrical casing 100 that is proximate to the center of the length of the cylindrical casing 100. The ridge 502 is similar to the retaining ring 501 that is described with reference to FIG. 5D. Different from the retaining ring 501 that is depicted in FIG. 5D, the ridge 502 is an integral portion of the inner surface 102 of the cylindrical casing 100. With the exception of the retaining ring 501 being detachable from the inner surface 102 of the cylindrical casing 100, and the ridge 502 being an integral portion of the inner surface 102 of the cylindrical casing 100, the remainder of the description of the elements depicted in FIG. 5D is suitable for the description of the elements that are depicted in FIG. 5E.

Figure 4A:
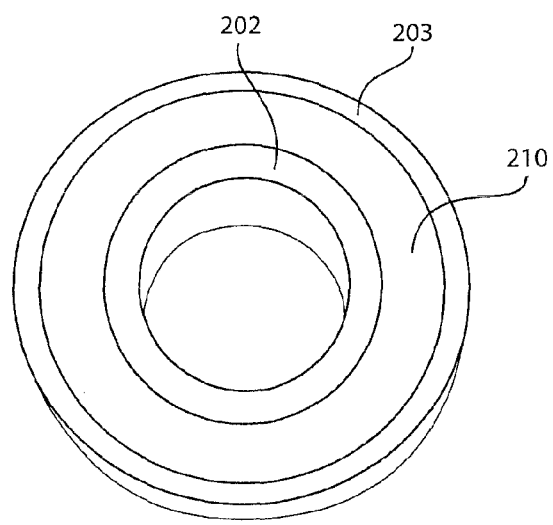
FIG. 4A is a photograph depicting a solid lubricant that has been applied to the anti-friction bearing depicted in FIG. 3A, in accordance with one embodiment of the present disclosure.
Figure 4B:
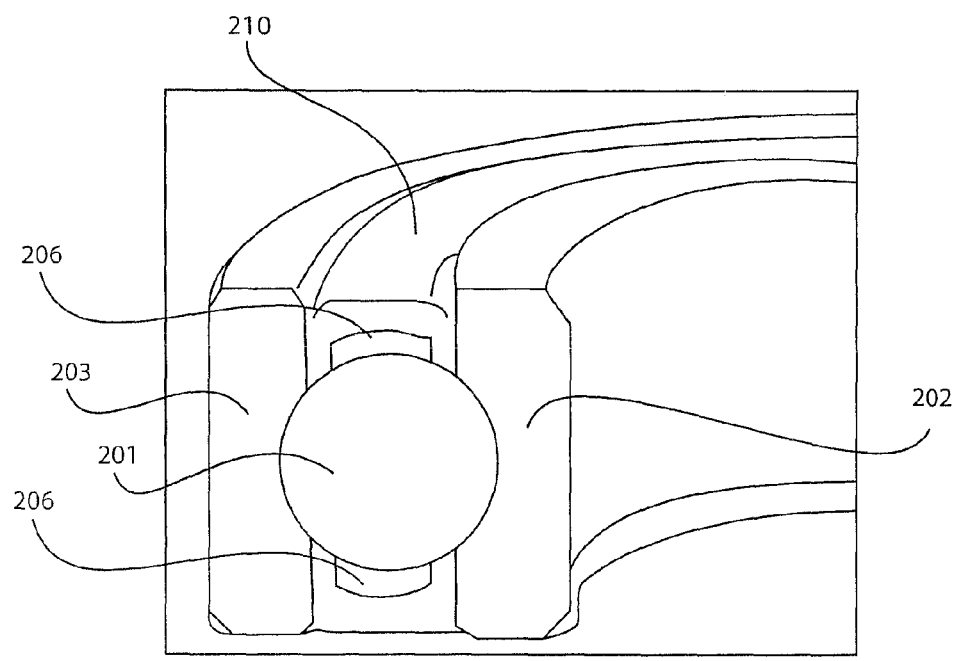
FIG. 4B is a photograph depicting a cross-section of an anti-friction bearing that has been lubricated with a solid lubricant that is consistent with the embodiment depicted in FIG. 4A.
Figure 4C:
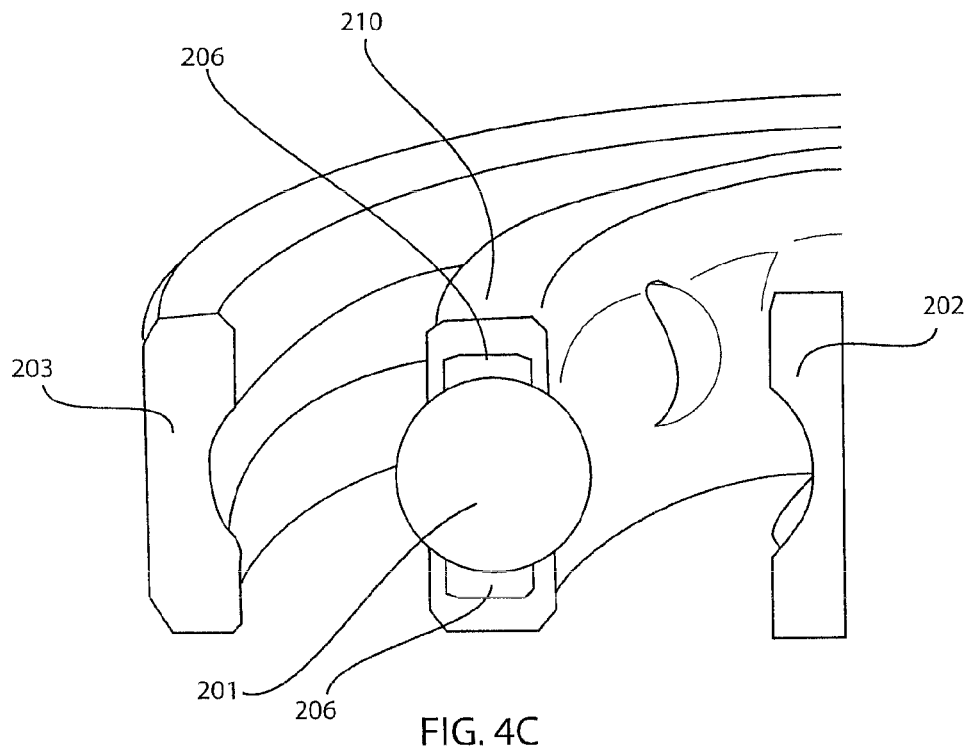
FIG. 4C is a photograph depicting an exploded cross-section of the sectioned anti-friction bearing that is depicted in FIG. 4B.
Figure 4D:
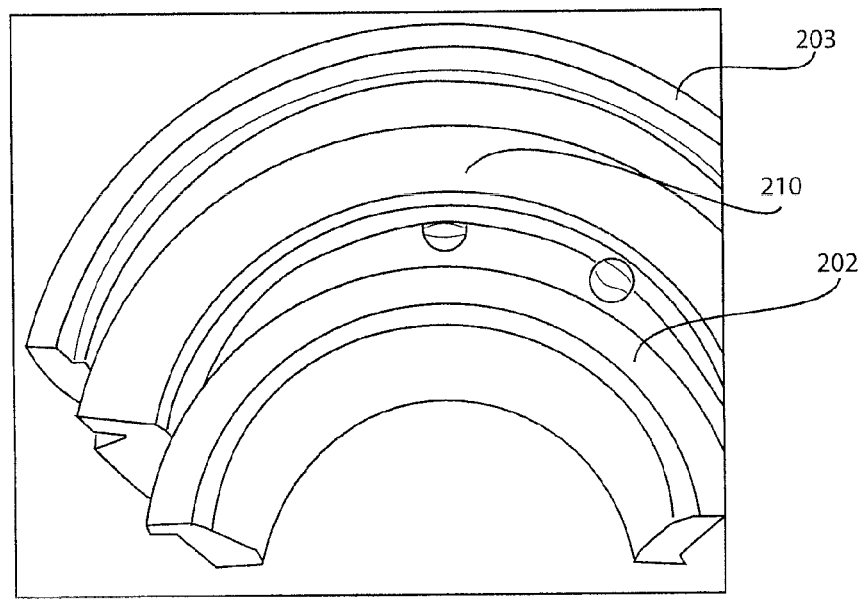
FIG. 4D is a photograph depicting an exploded side view of a sectioned anti-friction bearing that is consistent with the embodiment that is depicted in FIG. 4A.

Referring to FIGS. 1A-1C and FIGS. 5A-5E, in some embodiments, the roller structure may further include a dust shield 600a, 600b. In the embodiments depicted in FIGS. 1A-1C, 5A and 5B, the dust shield 600a may include an inner shield 601 and an outer shield 602. Each of the inner shield 601 and the outer shield 602 may have a centrally positioned opening to expose the bolt through hole 304 in the bushing 300a, 300b. In one embodiment, the inner shield 601 includes a cap portion 603 and a rim portion 604. The rim portion 604 is the widest portion of the inner shield 601. The cap portion 603 has dimensions to be positioned on the flange portion 302 of the bushing 300a, 300b. The outer shield 602 has an opening 605 that exposed the underlying cap portion 603 of the inner shield 601. Each of the outer shield 602 and the inner shield 601 may be formed from sheet metal using a stamping process. In other embodiments, the inner shield 601 and the outer shield 602 may be composed of a polymer. In some embodiments, the outer shield 602 may be deformed into engagement with a groove that is present in the inside surface 102 of the cylindrical casing 100. In FIGS. 4C-4E, the dust shield 600b is a single metal layer 606.

The roller structure with the graphite based solid lubricant is suitable for use in the metal industry, industrial ovens, food and beverage industry (e.g. ovens, smokehouse conveyor lines, wafer machines, sterilization), paint lines for automotive and powder paint, paper industry (e.g. paper converting lines), vacuum and space applications and oil and gas industry (e.g. applications with aggressive solvents). However, there are of course many other suitable areas of use where the bearing may function well.

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:
1. A roller structure comprising:
a cylindrical casing having an outer wear surface and an inner surface provided by a bore extending through the cylindrical casing;
at least a first and second anti-friction bearing positioned within the bore in contact with the inside surface of the cylindrical casing, wherein the first anti-friction bearing that is proximate to a first opening to the bore and the second anti-friction bearing is proximate to a second opening to the bore;

a first bushing proximate to a first side of the casing, the first bushing having a first flange and a first cylindrical body, wherein the first flange is in contact with an outer sidewall face of the inner ring of the first anti-friction bearing and the first cylindrical body is in contact with a bore face of the first anti-friction bearing, wherein the first cylindrical body has a first length;

a second bushing proximate to a second side of the casing, the second bushing having a second flange and a second cylindrical body having a second length that is greater than the first length, wherein the second flange is in contact with the outer sidewall face of the inner ring of the second anti-friction bearing and the second cylindrical body is in contact with the bore face of the second anti-friction bearing and the bore face of the first anti-friction bearing; and a spacer between the first anti-friction bearing and the second anti-friction bearing, wherein the spacer is in contact with the inner sidewall face of the inner ring of the first anti-friction bearing and the inner sidewall face of the inner ring of the second anti-friction bearing.

2. The roller structure of claim 1, wherein each of the first and the second anti-friction bearing comprises roller elements positioned between an inner ring and an outer ring, wherein a solid lubricant is positioned in a space defined between the inner ring, the outer ring and the roller elements.

3. The roller structure of claim 2, wherein the roller elements are selected from the group consisting of ball shape bearings, sphere shape bearings, cylindrical roller bearings, needle bearings, tapered bearings and a combination thereof.

4. The roller structure of claim 1, wherein the roller structure further comprises at least one retainer ring fitted to a groove in the inside surface of the cylindrical casing proximate to at least one of a first opening and a second opening to the bore through the casing, wherein the retainer ring contacts the outer ring of the at least one anti-friction bearing.

5. The roller structure of claim 1, wherein the at least one anti-friction bearing includes a first anti-friction bearing that is proximate to a first opening to the bore and a second anti-friction bearing that is proximate to a second opening to the bore, and the roller structure further comprises at least one retainer ring positioned substantially in a middle of the cylinder casing between the first and the second anti-friction bearing to prevent axial movement of the first and second anti-friction bearing.

6. A roller structure comprising:
a cylindrical casing having an outer wear surface and an inner surface provided by a bore extending through the cylindrical casing;
at least a first and second anti-friction bearing positioned within the bore in contact with the inside surface of the cylindrical casing, wherein the first anti-friction bearing that is proximate to a first opening to the bore and the second anti-friction bearing is proximate to a second opening to the bore, wherein at least one of said first and second anti-friction bearing comprises a solid lubricant;
a first bushing proximate to a first side of the casing, the first bushing having a first flange and a first cylindrical body, wherein the first flange is in contact with an outer sidewall face of the inner ring of the first anti-friction bearing and the first cylindrical body is in contact with a bore face of the first anti-friction bearing, wherein the first cylindrical body has a first length;

a second bushing proximate to a second side of the casing, the second bushing having a second flange and a second cylindrical body having a second length that is greater than the first length, wherein the second flange is in contact with the outer sidewall face of the inner ring of the second anti-friction bearing and the second cylindrical body is in contact with the bore face of the second anti-friction bearing and the bore face of the first anti-friction bearing; and a spacer between the first anti-friction bearing and the second anti-friction bearing, wherein the spacer is in contact with the inner sidewall face of the inner ring of the first anti-friction bearing and the inner sidewall face of the inner ring of the second anti-friction bearing.

7. The roller structure of claim 6, wherein said at least first and second anti-friction bearing includes two or more anti-friction bearings.

8. The roller structure of claim 6, wherein each of the at least said first and second anti-friction bearing comprises roller elements positioned between an inner ring and an outer ring, wherein the solid lubricant is positioned in a space defined between the inner ring, the outer ring and the roller elements.

9. The roller structure of claim 6, wherein the solid lubricant has a composition that is selected from the group consisting of graphite, molybdenum disulphide ($MoS_2$), boron nitride (BN), tungsten disulfide ($WS_2$), molybdenum (IV) selenide ($MoSe_2$), tantalum (IV) selenide ($TaSe_2$), titanium telluride ($TiTe_2$), gallium sulfide (GaS), gallium selenide (GaSe), tin selenide (SnSe), cadmium chloride ($CdCl_2$), cobalt chloride ($CoCl_2$), lead chloride ($PbCl_2$), cerium fluoride ($CeF_3$), lead (II) Iodide ($PbI_2$), sodium borate ($Na_2B_4O_7$), silver sulfate ($Ag_2SO_4$) and combinations thereof.

10. The roller structure of claim 6, wherein the solid lubricant is a polymer having a composition selected from the group consisting of polytetrafluoroethylene (PTFE), fluoroethylenepropylene (FEP), perfluoroalkoxy (PFA), polyethylene (PE), polypropylene (PP), polyurethane (PU), polyamide, polyacetals, polysiloxane, nylon, phenol-formaldehyde, urea-melamine-formaldehyde, epoxy resin, unsaturated polyester resin, polyimides and a combination thereof, or the solid lubricant is an oxide selected from the group consisting of boron oxide (B2O3), molybdenum oxide ($MoO_2$), zinc oxide (ZnO), renium oxide ($Re_2O_7$), titnaium oxide (TiO2), CuO—$MoO_2$, NiO—$Mo_2$, PbO—$B_2O_3$, CuO—$Re_2O_7$ and combinations thereof, or the solid lubricant is a metal selected from the group consisting of lead (Pb), tin (Sn), bismuth (Bi), indium (In), cadmium (Cd), silver (Ag) and combinations thereof, or the solid lubricant is a combination of the polymer, the oxide and the metal.

11. The roller structure of claim 6, wherein the solid lubricant further comprises particles comprising carbon, metal chalcogenides, boron nitride, boron nitride, zinc oxide, zinc phosphide, copper, boron, diamond like carbon (DLC), cerium fluoride, idium, lead, silver, tin or a combination thereof.

12. The roller structure of claim 11, wherein the particles have an average size ranging from 5 nm to 4 μm, wherein the particles have a geometry selected from the group consisting of solid sphere, hollow sphere, tubes, rods, platelets and a combination thereof.

13. The roller structure of claim 12, wherein a metal element of the metal chalcogendides is selected from the group consisting of molybdenum (Mo), tungsten (W), vanadium (V), zirconium (Zr), hafnium (Hf), platinum (Pt), palladium (Pd), rhenium (Re), niobium (Nb), tantalum (Ta), titanium (Ti), chromium (Cr), ruthenium (Ru) and a combination thereof, and the chalcogen is selected from the group consisting of selenium (Se), sulfur (S), tellurium (Te) and combinations thereof.

14. The roller structure of claim 6, wherein the solid lubricant is impregnated with an oil selected from the group consisting of mineral oil, synthetic oil, synthetic hydrocarbon oil, ester oil, synthetic ester oil, synthetic hydrocarbon and ester oil blend, polyalphaolefin (PAO) oil, polyalkylene glycol (PAG) and combinations thereof.

* * * * *